3,203,332
METHOD FOR MEASURING PHOTOGRAPHIC EXPOSURE TIME
Otto Deile and Kurt Albrecht Wehlmann, Wiesbaden-Biebrich, Germany, assignors, by mesne assignments, to Keuffel & Esser Company, Hoboken, N.J.
No Drawing. Filed Feb. 6, 1963, Ser. No. 256,517
Claims priority, application Germany, Feb. 7, 1962, K 45,841
1 Claim. (Cl. 95—73)

The present invention relates to a method for measuring photographic exposure time and more particularly refers to a method for measuring photographic exposure time by means of an exposure meter responsive to wave lengths in the region between 3000 and 4500 angstrom units.

Diazo prints for the preparation of printing plates are made by exposing a presensitized plate or foil under a master to light and developing the print. Many types of light sources are commonly used for exposure. Those used when a short exposure time is desired are carbon-arc lamps, high-pressure mercury vapor lamps, and cold-light lamps.

These various light sources differ from each other in the strength spectral distribution of their emission which varies with the working conditions and the age of the light source. Since the masters used may also differ in total transmissivity and spectral absorption, it is impossible to determine in advance the strength and nature of the light striking the presensitized material.

Owing to the variations in the nature of the light produced by the light source and transmitted through the master, varying exposure times are necessary for the production of the intended photochemical reaction in the light-sensitive layer of the copying material. This is unfavorable for a rapid production of different prints. At present it is necessary for the operator to make test prints, with which he endeavors to determine the most favorable exposure time for each particular case.

It is, of course, possible to assess the light passing through the master in the exposure apparatus by means of a photoelectric exposure meter. However, such meters conform basically to the sensitivity of the human eye. Thus, a light source with an emission maximum in the visible region will show a high reading on such a meter but will have little effect on a light-sensitive layer which is sensitive to light in a different region of the spectrum whereas a light source having considerable emission in the near ultraviolet spectral region and great effect on a light-sensitive layer will show a low reading on such a meter.

Photoelectric exposure meters comprising a photosensitive element which responds to radiation both in the short wave visible region and in the near ultraviolet region, and a filter in front of said element which, in substance, transmits only radiation in the shortwave visible spectral region and the near ultraviolet region have therefore been proposed. However, with such a system the mutual adjustment of the spectral sensitivities of the photo-sensitive element and of the light filter is difficult to obtain, so that false values for the exposure time often result.

One object of the present invention is to provide a method for measuring photographic exposure time to radiation in both the short wave visible region and the near ultraviolet region.

Another object is to provide a method for measuring photographic exposure time by means of a current-generating exposure meter.

Another object is to provide a method for terminating the photographic exposure time by means of a current-generating exposure meter.

Another object is to provide a process of measuring the correct exposure time for photographic material responsive to wavelength in the region between 3000 and 4500 angstrom units (AU.).

Other objects will become apparent during the course of the specification and claims.

The invention provides a method of measuring the correct exposure time for photographic material responsive to wave lengths in the region getween 3000 and 4500 A.U., which comprises the steps of: exposing to a light source an exposure meter comprising a filter system and a photosensitive element behind the filter system, said element being responsive to wave lengths in said region, the product of the sensitivity of the photosensitive element and the transmissivity of the filter system for each wave length being approximately the same as the sensitivity of the photographic material to be exposed for that same wave length, and determining the current generated in the exposure meter. The filter system used may be a single filter or a number of superposed filters. The method according to the invention is applicable to various types of photogarphic material, e.g., those sensitized with diazo compounds, silver halides and photoconductive materials.

The exposure meter can be used in any of the three following ways.

(1) It can be exposed directly to the light source in which case the exposure time is given $T = X \cdot F_o \cdot F_m$, where T is the exposure time in seconds, X is a factor which indicates the current during direct irradiation by a light source, said factor is measured in ma., $F_o$ is a factor representing the opacity of the master. Said factor is of nondimensional quality. If, by way of example, the light transparency of the master is 50%, the factor will be $F_o = 2$, $F_m$ is a factor representing the responsiveness, i.e., the speed of the light sensitive material. The dimension of the last mentioned factor is sec./ma.

(2) It can be exposed to the light source through the master in which case the exposure time is given by $T' = X' \cdot F_m$, where T' is the exposure time in seconds, X' is the current maintained in ma. and $F_m$ is a factor representing, as above, the speed of the light sensitive material, measured in sec./ma.

(3) It can be exposed to the light source through the master and the light sensitive material in superposition provided the light sensitive material is one which contains light sensitive compounds which decompose on exposure to the radiation from the source. In this case the exposure time is the time taken for the current in the exposure meter to reach its maximum. Various known types of photosensitive elements may be used, e.g., photoelectric cells, electron multipliers, photo-resistances, and photodiodes, provided that these are sensitive to wave lengths in the region between 3000 and 4500 A.U. and preferbaly bewteen 3700 and 4300 A.U.

Examples of suitable filters are gelatine filters, liquid filters, interfence filters and glass filters. Particularly favorable conditions are obtained with glass filters. These normally consist of at least one ground and colored glass plate, and may consist of a number of such plates in superposition.

The light sensitive diazo compounds commonly used in the diazotype industry absorb in the above-mentioned spectral region. The sensitivity curve is basically the same for all the diazo compounds used in the industry and is well known. It normally has a maximum at about 4000 A.U. The organic and inorganic substances used as photoconductors in electrophotogarphy also absorb in the same spectral region. The exact distribution of sensitivity of these compounds in this region is either known or can be readily determined by conventional methods.

The sensitivity curves for organic photoconductors are very well defined and extend over the range of 3000 to 4500 A.U. zinc oxide, which is often used as an inorganic photoconductor, has a wide absorption region.

To produce an exposure meter for use in accordance with the present invention the following procedure was adopted. The sensitivity curve of the photosensitive element of the photoelectric receiver was plotted. This curve is known and the range of the wave length with which we are here concerned generally takes the form of a straight line with an upward slope.

The absorption curve of the light-sensitive substance used, e.g., the diazo compound or photoconductor, was also plotted. The filter was then chosen so that the product of the sensitivity of the photosensitive element and the transmissivity of the filter for each wave length was approximately the same as the sensitivity of the light-sensitive compound to that wave length. A curve plotted on this basis represented the required transmissivity curve of the filter. Filters confronting with this curve were readily found because the transmissivity curves of light filters are known. This was the case with glass filters, which have a parabolic transmissivity curve with a maximum that varies according to the filter chosen and that is adjustable to different wave-length regions by superposition of different filters.

When liquid filters were used, the required transmissivity cure was obtained by inclusion of appropriate soluble substances and adjustment of the concentration thereof. Reputable optical firms market wide ranges of glass filters whose absorption curves are known.

A combination of glass filters was successfully used in conjunction with a conventional photoelectric element. The type of filter combination used in one form of this invention was an "Electrocell-Lichtelement type G.Q." Said glass filter combination consists of filters A and B, wherein filter A, in turn, consists of a glass filter combination which has its maximum transparency of between 80% and 85% at 3700 A.U. and whose transparency decreases uniformly until it reaches a value of 1% at 4700 A.U. and of 1% at 2950 A.U. A filter combination of this kind may, e.g., consist of two glass filters of the type "BG 1/4," manufactured by Jenaer Glaswerke Schott & Gen., Mainz, Germany. Filter B of said combination is a filter the transparency of which is about 1% at 3000 A.U., about 90% at 3500 A.U., and about 98% at 4500 A.U. and which strongly absorbs light in the red and infrared range of the spectrum. For example, a glass filter may be used which is marketed by the Jenaer Glaswerke, identified above, under the designation type "BG 38/2."

The "Electrocell-Lichtelement type G.Q." mentioned above is a selenium photoelement covered by a quartz plate. It is satisfactorily sensitive to light in the ultraviolet range of the spectrum and its light sensitivity increases uniformly by 100% from 3000 A.U. to 5000 A.U. Said "Electrocell-Lichtelement type G.Q." is marketed by the "Electrocell" company of Berlin-Dahlem, Germany.

The filter, which is preferably interchangeable, was situated during exposure between the copying material and the photoelectric element.

When it was desired to make diazo prints, test measurements were made by placing the exposure meter in the beam from the light source. Exact values for exposure times were obtained when the master to be copied was placed between the light source and exposure meter, as the actinic absorption of the master was then accounted for. The radiation which actually struck the light-sensitive layers to be placed later in position was thus measured for content of effective or actinic light.

Suitable light sources were: tungsten filament lamps, open arc lamps, enclosed arc lamps, repro lamps, fluorescent tubes, high-tension fluorescent tubes, mercury vapor lamps and high-pressure mercury lamps.

The invention also provides a method of measuring the correct time for exposure of light-sensitive material containing light-sensitive substances which decompose under the influence of radiation in the region between 3000 and 4500 A.U. which comprises the steps of: placing the light-sensitive material, behind a master, in front of an exposure meter as set forth above; exposing the light-sensitive material through the master to a light source; and terminating the exposure when the current in the exposure meter reaches its maximum.

This method was used for automatic exposure of the light-sensitive material by arranging for the light source to be switched off by a suitable switch mechanism, e.g., a relay operated electrically when the current in the exposure meter reached its maximum value. The procedure was as follows:

The master to be copied and the copying material which has a light-sensitive layer decomposable under the influence of radiation in the above stated range of wavelengths, e.g., a diazo layer, was exposed to a light source with the exposure meter behind the copying material. The support for the light-sensitive layer preferably consisted of translucent paper or transparent foil. At first the exposure meter gave no reaction because the radiation to which it is responsive was absorbed by the light-sensitive compound. When the light-sensitive compound had become decomposed in the image-free parts and was no longer capable of absorbing this radiation the exposure meter began to respond. This response was utilized via a suitable relay system to terminate the exposure. Exposure of the light-sensitive material was thus automatic and accurate. If desired, the adsorption of radiation in the above range of wave lengths by the support to which the light-senstive layer is applied can also be accomplished by measurement or by the use of an experience factor.

The exposure meter for use in accordance with the present invention responds only to the spectral region of the light source used which is effective for the exposure of the copying material. The magnitude of the indication afforded by the exposure meter is a direct measure of the required exposure time. Exact information on the appropriate exposure time is also obtained even when the nature of the light source is varied and even if its efficiency is altered by wear or by voltage variations provided a filter combination appropriate for the copying material is used.

It is of great value that the exposure can be automatically terminated.

It is apparent that the described examples are capable of many variations and modifications. All such variations and modifications are to be included within the scope of the present invention.

What is claimed is:

The method of producing proper exposures of a light decomposable diazo compound sensitized copy sheet material with economy of time, said diazo compound on said sheet having the characteristic of being progressively decomposed when exposed to actinic light and thereby progressively passing more actinic light until a maximum decomposition is reached which is the proper exposure, comprising placing a registering master with the copy sheet material between a source of light which includes actinic and non-actinic light for the selected light decomposable diazo compound with the master adjacent the source of light, and a current controlling photoelectric element with a filter passing principally only actininc light which decomposes the diazo compound and said filter being located between the copy sheet and the photoelectric element, said master, copy sheet, filter, and photoelectric element lying in the path of light from said light source, and continuing the exposure until the current in the photoelectric element reaches a maximum indicating that the portions of the diazo compound struck by light have been decomposed.

References Cited by the Examiner

UNITED STATES PATENTS

| | | | |
|---|---|---|---|
| 2,485,418 | 10/49 | Taylor | 250—83.3 |
| 2,490,011 | 12/49 | Bird | 250—83.3 |
| 2,531,000 | 11/50 | Scott | 250—83.3 |
| 2,905,755 | 9/59 | Neale. | |
| 3,077,401 | 2/63 | Van Der Grinten et al. | 95—73 X |
| 3,105,107 | 9/63 | Klausner | 88—23 |

EVON C. BLUNK, *Primary Examiner.*